United States Patent [19]

Machacek et al.

[11] Patent Number: 5,435,864
[45] Date of Patent: Jul. 25, 1995

[54] RECLOSABLE ZIPPER WITH TAMPER EVIDENT FEATURE

[75] Inventors: Zdenek Machacek, Nanuet, N.Y.; Lawrence Share, Skokie, Ill.

[73] Assignee: Minigrip, Inc., Orangeburg, N.Y.

[21] Appl. No.: 164,391

[22] Filed: Dec. 9, 1993

Related U.S. Application Data

[63] Continuation-in-part of Ser. No. 51,612, Apr. 22, 1993.

[51] Int. Cl.⁶ .............. B32B 31/20; B32B 31/30; B65D 33/24; B65D 33/34
[52] U.S. Cl. ........................................ 156/66; 24/399; 24/400; 24/576; 24/587; 156/82; 156/244.18; 156/244.27; 156/260; 156/272.6; 383/61; 383/63; 383/211; 493/213; 493/214
[58] Field of Search ............... 156/66, 272.2, 272.6, 156/260, 275.3, 82, 244.18, 244.23, 244.25, 244.27; 383/61, 63, 211; 24/399–400, 576, 587; 493/213–214

[56] References Cited

U.S. PATENT DOCUMENTS

| | | | |
|---|---|---|---|
| 3,986,914 | 10/1976 | Howard | 156/66 X |
| 4,540,537 | 9/1985 | Kamp | 156/66 X |
| 4,925,318 | 5/1990 | Sorensen | . |
| 4,947,525 | 8/1990 | Van Erden | 156/66 X |
| 4,966,470 | 10/1990 | Thompson et al. | 383/61 |
| 4,969,967 | 11/1990 | Sorensen | . |
| 5,188,461 | 2/1993 | Sorensen | . |
| 5,224,779 | 7/1993 | Thompson et al. | 38.3/61 X |
| 5,238,306 | 8/1993 | Heintz et al. | 383/63 X |

*Primary Examiner*—Adrienne Johnstone
*Attorney, Agent, or Firm*—Kane, Dalsimer, Sullivan, Kurucz, Levy, Eisele and Richard

[57] ABSTRACT

A plastic bag having a reclosable plastic zipper is provided with a tamper-evident, non-reclosable peel seal formed by coextruding an adhesive onto a side strip adjacent to the interlocking zipper. The coextrusion causes the adhesive to preferentially adhere to the side strip when the peel seal is broken. A method for manufacturing the reclosable plastic zipper includes the steps of coextruding a zipper profile including a plane area with an adhesive on the plane area, slitting the profile lengthwise, and folding over one of the resulting sides of the zipper to interlock them with one another.

8 Claims, 7 Drawing Sheets

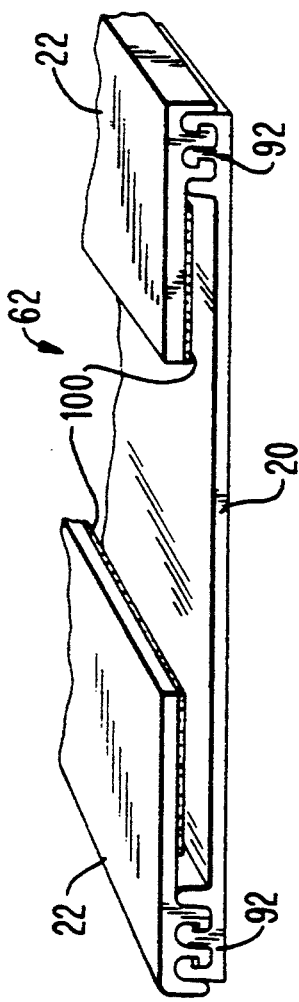
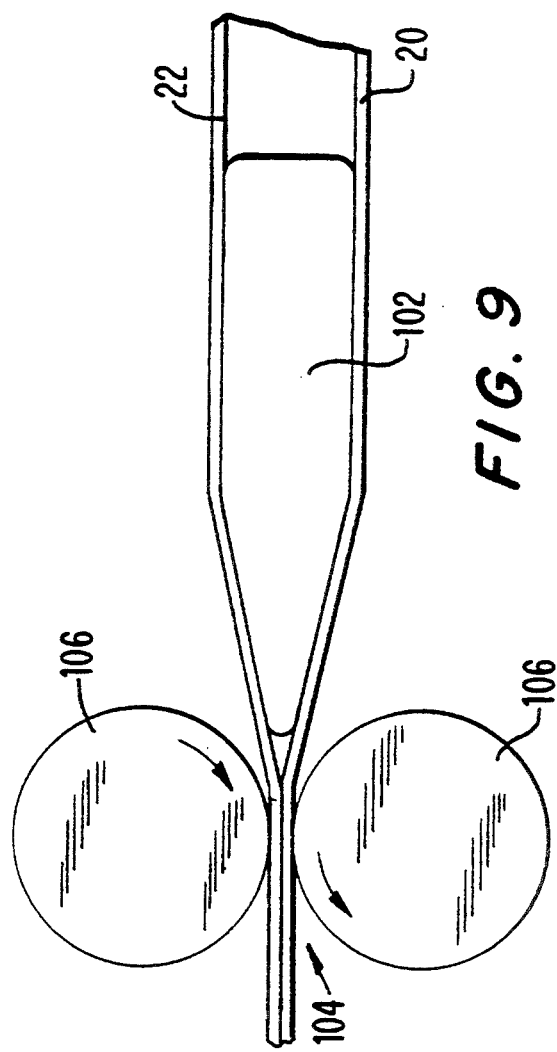

RECLOSABLE ZIPPER WITH TAMPER EVIDENT FEATURE

CROSS-REFERENCE TO RELATED APPLICATION

This is a continuation-in-part of U.S. patent application Ser. No. 08/051,612, filed on April 22, 1993.

BACKGROUND OF THE INVENTION

1. Field of The Invention

This relates in general to the packaging art, and more particularly is concerned with a continuous reclosable plastic zipper of a type which is used to close the mouth of a bag or package, and which includes, either before or after the zipper relative to the mouth of the bag or package, a tamper-evident non-reclosable peel-seal feature.

2. Description of the Prior Art

In the use of plastic bags and packages, particularly for foodstuffs, it is important that the bag be hermetically sealed until the purchaser acquires the bag and its contents, takes them home, and opens the bag or package for the first time. It is then commercially attractive and useful for the consumer that the bag or package be reclosable so that its contents may be protected. Flexible plastic zippers have proven to be excellent for reclosable bags, because they may be manufactured with high-speed equipment and are reliable for repeated reuse. A typical zipper is one which has a groove at one side of the bag mouth and a rib at the other side, which rib may interlock into the groove when the sides of the mouth of the bag are pressed together. Alternatively, a member having a plurality of ribs may be on one side of the bag mouth, while a member having a plurality of channels may be on the other side, the ribs locking into the channels when the sides of the mouth of the bag are pressed together. In such a case, there may be no difference in appearance between the two members, as the ribs may simply be the intervals between channels on a strip which may lock into another of the same kind. In general, and in short, some form of male/female interengagement is used to join the two sides of the bag mouth together. The so-called members, or strips, are bonded in some manner to the material from which the bags themselves are manufactured.

Usually, pull flanges extend above the rib and groove strips, which pull flanges may be pulled apart for access to the interior of the bag.

Although flexible zippers of this variety are quite popular, they do not always prevent the inadvertent or unwelcome opening of a bag or package within the store, and various additions have been made to provide tamper-evident seals which would reveal when it has been opened prior to purchase.

It is clear then that, in spite of the fairly high state of development in this art, there are certain objectives which have not been fully met. In particular, tamper-evident non-reclosable peel seals in plastic bags of the prior art remain characterized by highly inconsistent opening forces. That is to say, the development of a tamper-evident non-reclosable peel seal requiring a reproducibly consistent opening force, large enough to obviate accidental or unintended opening, yet small enough that the bag itself may not be damaged during separation of the peel seal, has to date eluded those skilled in the art. At the same time, the requirement that the adhesive used to form the peel seal remain on only one side of the bag, without the formation of adhesive filaments across the bag opening, and not read here when the bag is closed, has not been satisfied in the bags of the prior art.

It is accordingly an object of the present invention to provide an improved tamper-evident non-reclosable peel seal suitable for use with reclosable plastic zippers in plastic bags and other packages to provide a hermetic seal until the peel seal is opened for the first time, and to provide a peel seal which is non-reclosable after being opened.

SUMMARY OF THE INVENTION

The present invention may be summarized as follows. In a process by which an interlockable zipper profile for reclosable plastic bags and packages is extruded from a polymeric resin material, an adhesive is coextruded onto a strip-like area adjacent and parallel to one of the two interlocking rib or groove members of the interlockable zipper profile. The coextrusion causes the adhesive to preferentially adhere to the strip-like area. The adhesive, which is coextruded onto the strip-like area to form a peel seal, is retained on that area when the peel seal is broken for the first time. Thereafter, the peel seal remains broken, as the adhesive does not have an affinity for the plastic of the opposite rib or groove member once it has been separated therefrom.

The present invention will now be described in more complete detail with reference being made to the figures identified below.

BRIEF DESCRIPTION OF THE DRAWINGS

FIG. 8 shows the appearance of the profile at the conclusion of the manufacturing process.

FIG. 9 illustrates the means by which separated components of the profile are joined to one another.

DETAILED DESCRIPTION OF THE PREFERRED EMBODIMENT

Figure 1:
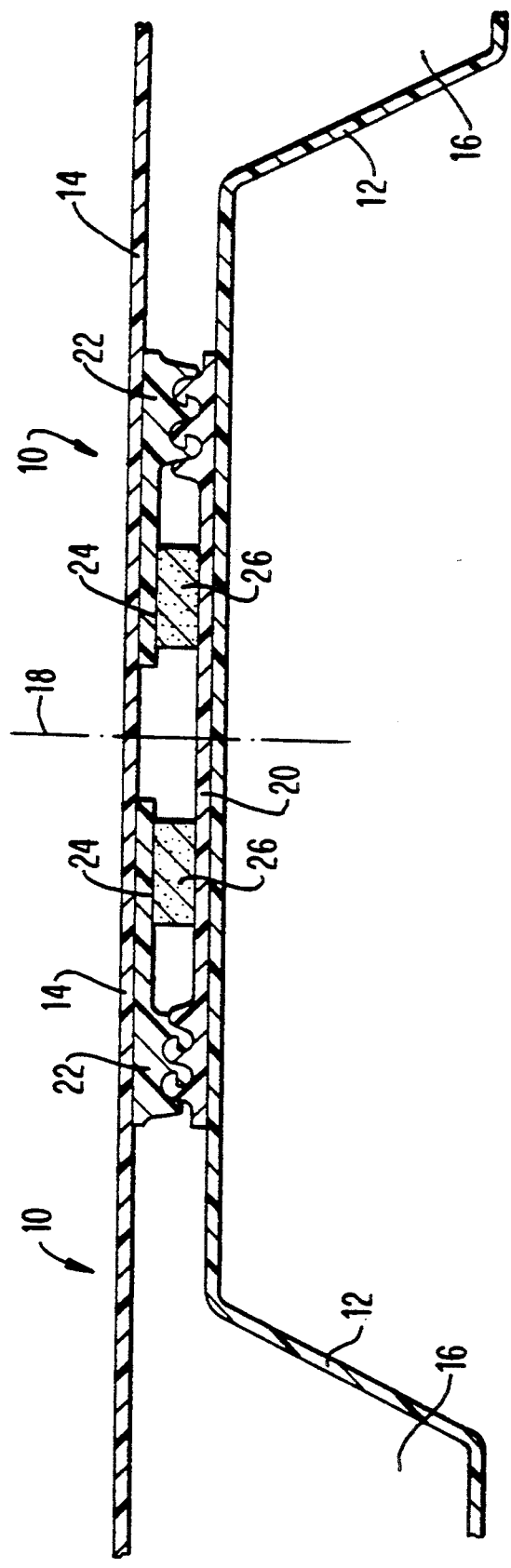
FIG. 1 is a schematic cross-sectional view of a portion of two reclosable plastic packages which include a tamper-evident non-reclosable peel seal provided in accordance with the present invention.

Referring to FIG. 1, a schematic cross-sectional view of a portion of two reclosable plastic packages is shown. The packages 10 comprise a common lower plastic sheet 12 of plastic materials and a common upper plastic sheet 14. The lower sheet 12 may be thermoformed to produce compartments 16 in which a product may be carried. At a suitable point in the package manufacturing and filling process, the packages 10 may be separated from one another by cutting at the point indicated by dashed line 18.

When such a cut has been made, the open end, or mouth, of each package 10 has interlockable rib and groove members, which, in the embodiment shown, may be referred to as the long web 20 and the short webs 22. The so-called long web 20 has two such interlockable rib and groove members on its opposed edges; the short webs 22 have but one. It will be evident, however, that, when the packages 10 are separated from one another by cutting as indicated by dashed line 18, the long web 20 must be cut as well.

The long web 20 and short webs 22 are, in an actual package 10, bonded to the inside of the lower sheet 12 and upper sheet 14, respectively. When the packages 10 are separated by cutting as indicated by dashed line 18, the long web 20, having been cut in half, and the short webs 22 are adjacent to the mouths of the packages 10. In such a case, the lower sheet 12 and the upper sheet 14 provides means whereby the package 10 may be opened by pulling the upper sheet 14 away from the lower sheet 12 to open the plastic zipper formed by half of the long web 20 and a short web 22 to gain access to the contents of the package 10.

The present tamper-evident, non-reclosable peel seal is provided by coextruding an adhesive 26 onto those portions 24 of the short webs 22 adjacent to the rib and groove members to cause the adhesive 26 used to form the peel seal to preferentially adhere thereto. It should be observed, however, that the adhesive 26 may be extruded onto appropriate locations on the long web 20 instead of onto the short webs 22. When the peel seal is broken, the adhesive 26 will reside on the "coextruded" side because the strength of the coextruded bond is greater than that of the bond between the adhesive and other web.

The so-called long web 20 and short webs 22 may be extruded from a synthetic, polymeric material, such as polyethylene. An adhesive, for example, Pierce and Stevens E4009D adhesive, has been coextruded onto short webs 22 in thicknesses of 0.0015 to 0.005 inch, and has provided excellent peel seals at those coating thicknesses.

Figure 2:
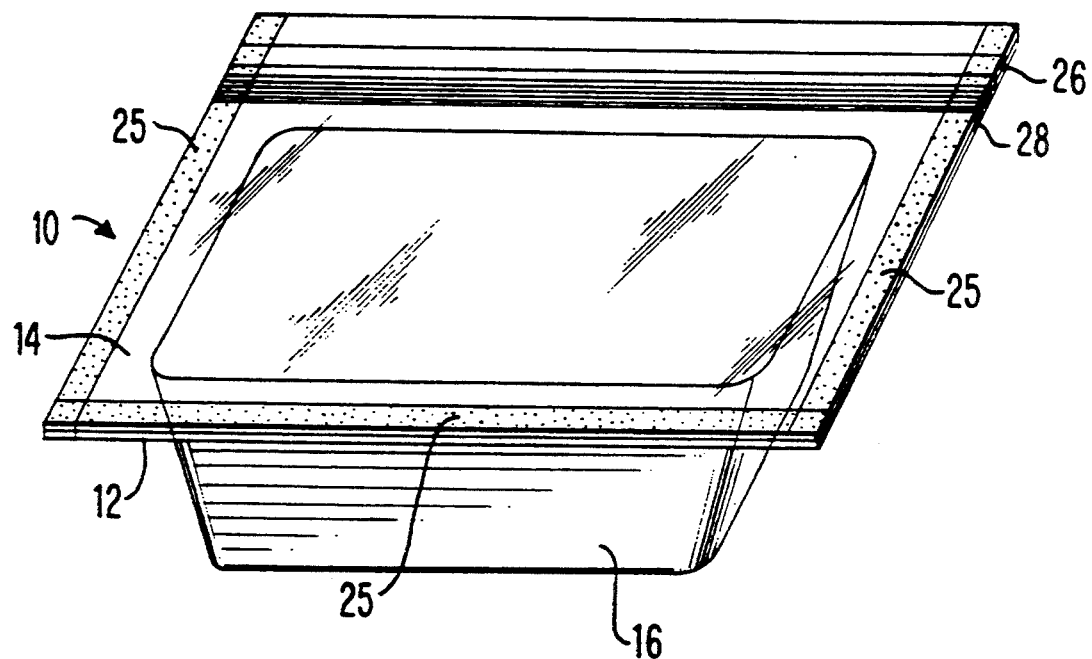
FIG. 2 is a perspective view of the package partially shown in cross section in FIG. 1.

FIG. 2 is a perspective view of the package 10 partially shown in cross section in FIG. 1. The lower plastic sheet 12 thereof is thermoformed to produce a compartment 16 for a product. The upper plastic sheet 14 is bonded or fused to the lower plastic sheet 12 on four sides of the perimeter of the package 10, as indicated by regions 25. On the fourth side, which is the farthest from a viewer of FIG. 2, the adhesive 26 provides a peel seal between the upper plastic sheet 14 and the lower plastic sheet 12. Zipper 28, formed by the interlocking rib and groove members on the long web 20 and short web 22, is inward of the adhesive 26. The peel seal provided by the adhesive 26 must be broken before access to the compartment 16 and to its contents may be gained.

Figure 3:
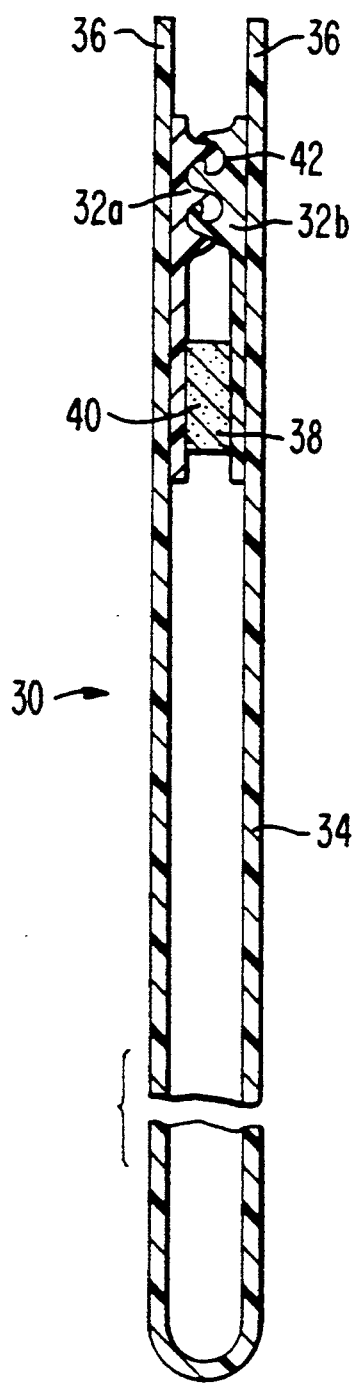
FIG. 3 is a schematic cross-sectional view of a reclosable plastic bag including the peel seal of the present invention.

FIG. 3 is a schematic cross-sectional view of a reclosable plastic bag having the peel seal of the present invention. The bag 30, shown in a sealed condition, comprises a pair of webs 32a, 32b affixed to the sheet 34 from which the bag 30 is formed. The webs 32a, 32b are affixed so as to leave flanges 36 of sheet 34 thereabove, the flanges 36 being pulled apart to open the bag 30. Adhesive 38 is coextruded onto web 32b during the extrusion process, illustrated in FIG. 5, by extruder 66 as an integral part of web 32b to form peel seal 40. A coextruded bond is accordingly formed between web 32b and adhesive 38. When the peel seal 40 has been broken, the adhesive 38 will reside entirely upon web 32b, and will not again adhere to web 32a to reclose the peel seal 40. The degree of adhesion between adhesive 38 and web 32a is controlled by adjusting the temperature and dwell settings of the sealing heads of the packaging machine. The adjustment is made so that the bond between adhesive 38 and web 32b is greater than the cohesive strength of adhesive 38 which in turn is greater than the adhesive strength between 38 and web 32a. As will be noted in FIG. 3, the reclosable zipper 42 formed by the interlocking rib and groove members of the webs 32 may be closer to the mouth of the bag than the peel seal 40.

Figure 4:
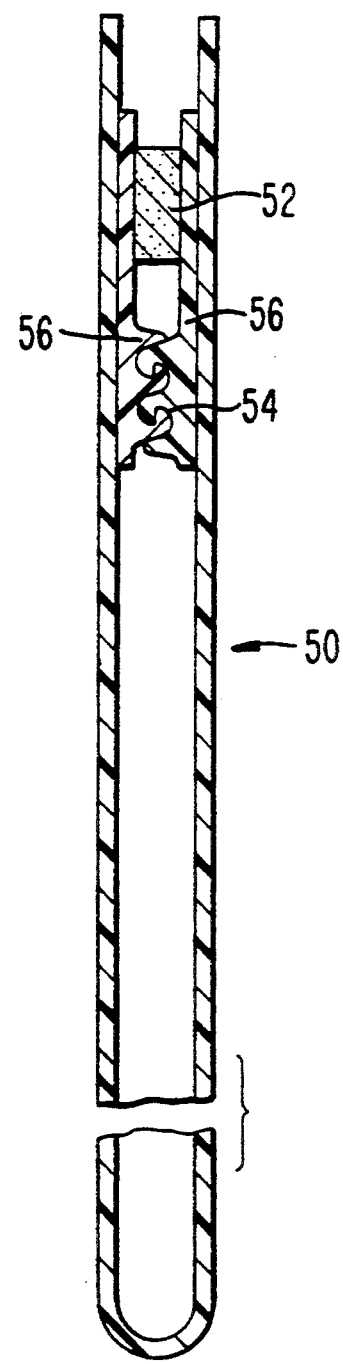
FIG. 4 is a schematic cross-sectional view of another reclosable plastic bag having the present peel seal.

FIG. 4 is a schematic, cross-sectional view of another reclosable plastic bag 50 having the present peel seal. It will be observed that bag 50 is identical to bag 30, shown in FIG. 3, except that the adhesive 52 is closer to the mouth of the bag 50 than is the reclosable zipper 54 formed by the interlocking rib and groove members on webs 56.

Figure 5:
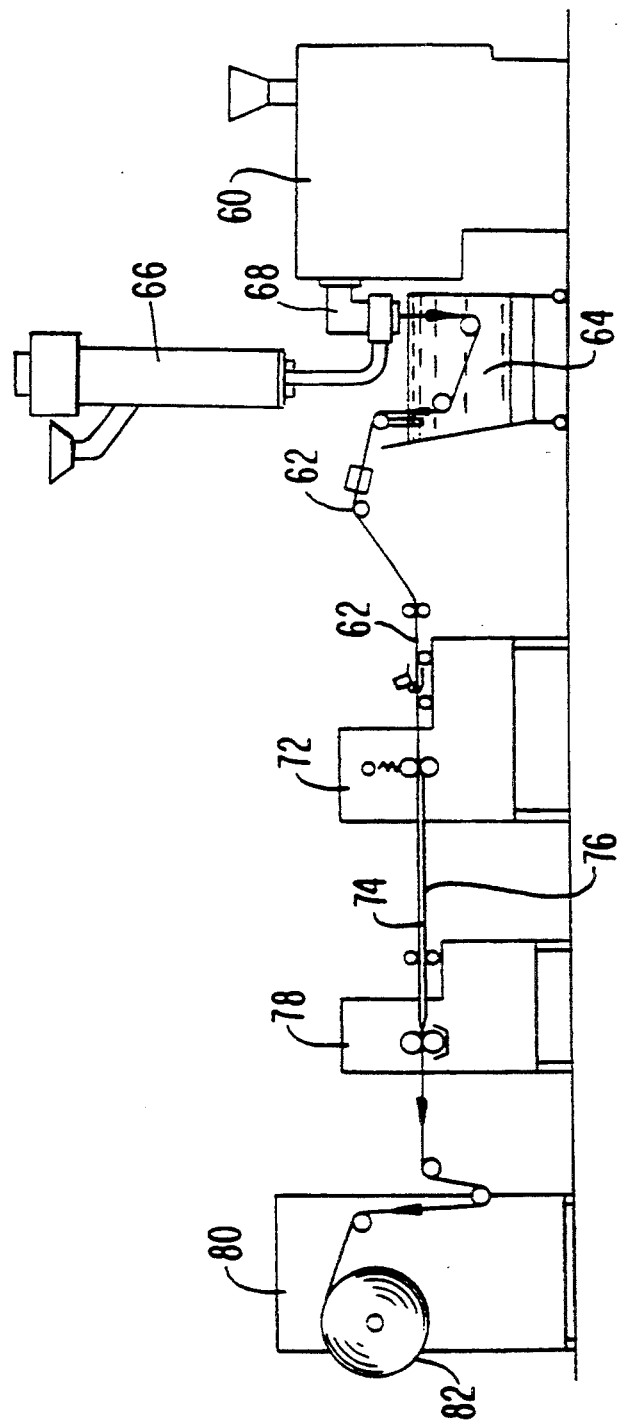
FIG. 5 is a schematic view illustrating the process by which a plastic zipper may be provided with the peel seal of the present invention.

FIG. 5 is a schematic view illustrating the process by which long webs and short webs, or profiles, such as long web 20 and short web 22 shown in FIG. 1, may be formed with the peel seal of the present invention. The process begins with an extruder 60, with which the profile 62 is extruded from a synthetic polymeric material, such as polyethylene. Adhesive is coextruded at desired areas of the profile 62 by extruder 66.

The profile 62 exits from extrusion die 68 into a water tank 64, which quenches and cools the newly extruded profile 62 rapidly to a desired temperature.

In slitter 72, the profile 62 is continually slit lengthwise into at least two components 74,76 in a manner to be illustrated below. Components 74,76 are rejoined to one another by joiner 78, and, finally, are wound onto a spool 82 by winder 80 for subsequent use in the manufacture of plastic bags or packages.

Figure 6:
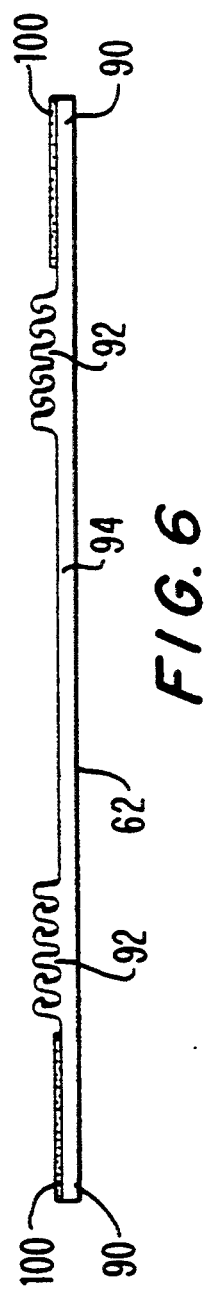
FIG. 6 is a cross section taken through the extruded profile from which the zipper is made at a point in the manufacturing process.

Referring now to FIG. 6, the profile 62, which comprises both the long web 20 and the short webs 22 shown in FIG. 1, comprises plane areas 90 along its lateral edges, groove and rib members 92 and a central plane region 94. Adhesive 100 has been coextruded onto the lateral plane areas 90 to enable the adhesive 100 used to form the peel seal to preferentially adhere thereto. Alternatively, adhesive 100 may be coextruded onto the central plane region 94 instead of onto the lateral plane areas 90. The coextrusion of the adhesive 100 onto the profile 62 ensures that the peel seal material may be retained by the area onto which it was extruded when the resealable plastic zipper is first opened, and the peel seal first broken.

Figure 7:
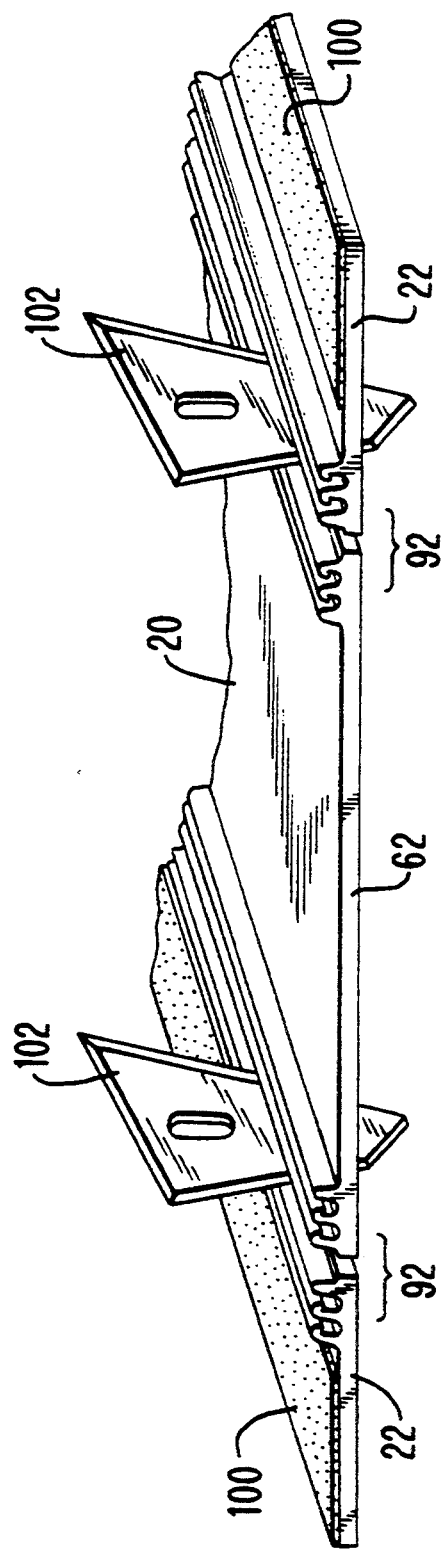
FIG. 7 depicts the extruded profile at a later point in the manufacturing process.

FIG. 7 depicts what is done to the profile 62 as it passes through the slitter 72 as shown in FIG. 5. At least one slitting blade 102 cuts the profile 62 longitudinally through the rib and groove members 92. It will be noted, by comparison with FIG. 1, that the profile 62 is thereby divided into a long web 20 and two short webs 22. In the preceding discussion of FIG. 5, these were referred to as components 74,76.

FIG. 8 shows the appearance of profile 62 upon its exit from the joiner 78. In the joiner 78, shown previously in FIG. 5, the two short webs 22, produced from the profile 62 by slitting blades 102, are folded over or inverted, and joined to the long web 20 by rib and groove members 92. The adhesive 100, as a consequence of this inversion, is disposed on those faces of the short webs 22 facing the long web 20.

FIG. 9 illustrates components of the joiner 78 which leave the profile 62 in the condition shown in FIG. 8. The long web 20 and short webs 22 are separated from one another as shown in FIG. 7, and the short webs 22 folded over as noted in the preceding paragraph. Separated from one another, they proceed, within the joiner, toward a merging wedge 102, which aligns rib and groove members 92 for subsequent engagement. Thus merged, the long web 20 and short webs 22 proceed to pinch rolls 106, which force the rib and groove members 92 to interlock with one another as shown in FIG. 8. In such condition, the profile 62 may be wound onto spools 82 by winder 80 in FIG. 5 for subsequent use in the manufacture of plastic bags or packages.

In the subsequent packaging machine operation, the peel seal is activated by the application of degrees of heat and pressure from one or more sealing bars positioned parallel to the peel seal area on the zipper.

The peel seal opening force is controlled by increasing and decreasing temperature and dwell settings. That is to say, a controlled predictable peel seal is obtained by the application of incremental degrees of heat and dwell from sealing bars parallel to the peel seal. As the hot peel seal material, or adhesive, cools, a hermetic seal bond is formed essentially bonding the short webs 22 to the long web 20. When the peel seal is first opened, this bond is broken, the adhesive remains on the web onto which it was coextruded, and does not reseal onto the opposite web.

The side strips of the first and second flexible plastic webs may be pressed together under heat by passing the side strip of the first flexible plastic web over a first sealing bar and by passing the side strip of the second flexible plastic web over a second sealing bar, the first and second sealing bars being heated and pressing the side strips of the first and second flexible plastic webs together. One of the two sealing bars may be at a higher temperature than the other. Further, one or more of the temperature, dwell time and pressure of the first and second sealing bars may be adjusted so that the bond between the adhesive and the first web may be greater than the cohesive force of the adhesive, which, in turn, is greater than the adhesive force between the adhesive and the second web.

The present unique method of inducing a preferential peel seal from one surface overcomes the prior art, wherein cohesive failure and stringing between two opposing partially fused materials causes erratic and unpredictable peel forces. Another disadvantage of the prior art is product contamination by stringing out or bridging of the two partially fused thermoplastics used in the peel seal.

Modifications to the above would be obvious to those skilled in the art, but would not bring the invention so modified beyond the scope of the appended claims.

What is claimed is:

1. A method for forming a tamper-evident, non-reclosable peel seal for a reclosable plastic bag, comprising the steps of:

coextruding a first flexible plastic web having an interlockable rib and groove member and a side strip adjacent thereto from a polymeric resin material with an adhesive, said adhesive being coextruded onto said side strip, so that it may preferentially adhere thereto;

extruding a second flexible plastic web having an interlockable rib and groove member, said second flexible plastic web thereby being interlockable with said first flexible plastic web, said second flexible plastic web not having an adhesive, and a side strip adjacent thereto;

heating said first and second side strips of said first add second flexible plastic webs to different temperatures and pressing said side strips of said first and second flexible plastic webs together under heat, said adhesive being between said side strips; and cooling said first and second flexible plastic webs to form a hermetic, tamper-evident non-reclosable peel seal between said side strips of said first and second flexible plastic webs, and so that all of said adhesive may remain on said side strip of said first flexible plastic web when said peel seal is broken.

2. A method as claimed in claim 1 wherein said step of pressing said side strips of said first and second flexible plastic webs together under heat comprises passing said side strip of said first flexible plastic web over a first sealing bar and passing said side strip of said second flexible plastic web over a second sealing bar, said first and second sealing bars being heated and pressing said side strips of said first and second flexible plastic webs together.

3. A method in accordance with claim 2 wherein one or both of the dwell time and pressure of said first and second sealing bars is adjusted.

4. A method for manufacturing a reclosable zipper having a tamper-evident, non-reclosable peel seal for a reclosable plastic bag comprising:

coextruding a profile having interlockable rib and groove members and two plane areas from a polymeric resin material with an adhesive, said adhesive being coextruded onto one of said two plane areas, and not on the other, so that it may preferentially adhere thereto, and so that all of said adhesive may remain on said one of said two plane areas when said peel seal is broken;

slitting said profile longitudinally to produce two interlockable sides of said zipper, one side having said plane area with said adhesive; and folding over one of said two sides of said zipper, so that said plane area with said adhesive faces the other of said two plane areas, and so that said rib and groove members may be interlocked with one another; and heating said first and second areas to different temperatures and pressing said plane areas together under heat, said adhesive being between said plane areas, to form said peel seal.

5. A method as claimed in claim 4 further comprising the step of interlocking said rib and groove members with one another.

6. A method as claimed in claim 4 wherein said slitting step is performed longitudinally through said interlockable rib and groove members.

7. A method as claimed in claim 4 wherein said slitting step is performed longitudinally between said two plane areas.

8. A method as claimed in claim 4 further comprising the steps of:

providing a first ply and a second ply of plastic sheet material;

welding said first ply of plastic sheet material to one of said two sides of said zipper; and welding said second ply of plastic sheet material to the other of said two sides of said zipper.

* * * * *